US012600370B2

(12) United States Patent
    Kotambail et al.

(10) Patent No.: US 12,600,370 B2
(45) Date of Patent: Apr. 14, 2026

(54) VEHICULAR CONTROL SYSTEM

(71) Applicant: Magna Electronics Inc., Auburn Hills, MI (US)

(72) Inventors: Ramachandra Bhat Kotambail, Karnataka State (IN); Komal Jha, Karnataka State (IN)

(73) Assignee: Magna Electronics Inc., Auburn Hills, MI (US)

( * ) Notice: Subject to any disclaimer, the term of this patent is extended or adjusted under 35 U.S.C. 154(b) by 93 days.

(21) Appl. No.: 18/650,253

(22) Filed: Apr. 30, 2024

(65) Prior Publication Data

US 2024/0367665 A1     Nov. 7, 2024

Related U.S. Application Data

(60) Provisional application No. 63/499,541, filed on May 2, 2023.

(51) Int. Cl.
    *B60W 50/08*     (2020.01)

(52) U.S. Cl.
    CPC ..... *B60W 50/082* (2013.01); *B60W 2420/403* (2013.01); *B60W 2540/30* (2013.01); *B60W 2552/00* (2020.02); *B60W 2555/20* (2020.02)

(58) Field of Classification Search
    CPC ....... B60W 2420/403; B60W 2540/30; B60W 2552/00; B60W 2555/20; B60W 50/082
    See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,815,824 A * | 9/1998 | Saga ..................... | B60W 20/00 |
| | | | 180/65.245 |
| 5,949,331 A | 9/1999 | Schofield et al. | |
| 7,038,577 B2 | 5/2006 | Pawlicki et al. | |
| 7,720,580 B2 | 5/2010 | Higgins-Luthman | |
| 7,855,755 B2 | 12/2010 | Weller et al. | |
| 9,925,980 B2 * | 3/2018 | Edo-Ros ................... | B60T 7/12 |
| 10,071,687 B2 | 9/2018 | Ihlenburg et al. | |
| 10,099,614 B2 | 10/2018 | Diessner | |

(Continued)

FOREIGN PATENT DOCUMENTS

| | | | | |
|---|---|---|---|---|
| CN | 104417344 A * | 3/2015 | ............ | B60W 20/20 |
| CN | 105711592 A * | 6/2016 | .......... | B60W 30/143 |

(Continued)

*Primary Examiner* — Babar Sarwar
(74) *Attorney, Agent, or Firm* — HONIGMAN LLP

(57)     ABSTRACT

A vehicular control system includes an electronic control unit (ECU) and a camera disposed at a vehicle and viewing exterior of the vehicle. The ECU includes an image processor operable to process image data captured by the camera and transferred to the ECU. The vehicular control system, responsive to processing at the ECU of image data captured by the camera, determines a condition exterior of the vehicle. The vehicular control system, based on the determined condition, switches from a power operational mode to an economy operational mode. The power operational mode provides greater performance of the vehicle compared to the economy operational mode, and the economy operational mode provides greater fuel efficiency for the vehicle compared to the power operational mode.

20 Claims, 3 Drawing Sheets

(56) References Cited

U.S. PATENT DOCUMENTS

| | | | | |
|---|---|---|---|---|
| 10,641,836 | B1 * | 5/2020 | Hou | G01R 31/392 |
| 12,330,670 | B2 | 6/2025 | Ravuri | |
| 12,371,027 | B2 | 7/2025 | Vasoya et al. | |
| 2013/0151074 | A1 * | 6/2013 | Takeuchi | B60W 10/06 |
| | | | | 701/41 |
| 2014/0025240 | A1 | 1/2014 | Steigerwald et al. | |
| 2014/0222296 | A1 * | 8/2014 | Takeuchi | F16H 59/00 |
| | | | | 701/48 |
| 2015/0307131 | A1 * | 10/2015 | Froeschl | B62D 15/025 |
| | | | | 701/25 |
| 2017/0240174 | A1 * | 8/2017 | Sawada | G01C 21/3469 |
| 2019/0031187 | A1 * | 1/2019 | Noguerol | B60W 40/08 |
| 2019/0118830 | A1 * | 4/2019 | Kwon | B60K 35/22 |
| 2021/0012584 | A1 * | 1/2021 | Saavedra Román | G06N 5/046 |
| 2021/0390349 | A1 * | 12/2021 | Hotson | G06V 10/7753 |
| 2023/0303107 | A1 * | 9/2023 | Kishita | B60W 40/08 |
| 2024/0321099 | A1 * | 9/2024 | Perez Barrera | B60W 30/09 |

FOREIGN PATENT DOCUMENTS

| | | | | | |
|---|---|---|---|---|---|
| CN | 106715217 | A | * | 5/2017 | B60L 50/16 |
| CN | 110696830 | A | * | 1/2020 | B60W 30/182 |
| CN | 114475601 | A | * | 5/2022 | B60W 30/165 |
| DE | 112011105457 | T5 | * | 5/2014 | F16H 59/00 |
| DE | 102022124245 | A1 | * | 6/2023 | G06V 20/584 |
| EP | 2505423 | A1 | * | 10/2012 | B60L 15/20 |
| EP | 3756931 | A1 | * | 12/2020 | G08G 1/09 |
| JP | 4742416 | B2 | * | 8/2011 | |
| KR | 102289158 | B1 | * | 8/2021 | B60W 60/00186 |
| RU | 2561478 | C1 | * | 8/2015 | B60W 10/11 |
| WO | WO-2013088509 | A1 | * | 6/2013 | B60W 20/40 |
| WO | WO-2015032321 | A1 | * | 3/2015 | B60W 30/182 |
| WO | WO-2024021702 | A1 | * | 2/2024 | B60L 15/2045 |

* cited by examiner

VEHICULAR CONTROL SYSTEM

CROSS REFERENCE TO RELATED APPLICATION

The present application claims the filing benefits of U.S. provisional application Ser. No. 63/499,541, filed May 2, 2023, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular control system includes a camera disposed at a vehicle equipped with the vehicular control system. The camera views exterior of the vehicle and is operable to capture image data. The camera includes a CMOS imaging array with at least one million photosensors arranged in rows and columns. The system includes an electronic control unit (ECU) with electronic circuitry and associated software. Image data captured by the camera is transferred to the ECU. The electronic circuitry of the ECU includes an image processor that is operable to process image data captured by the camera and transferred to the ECU. The vehicular control system, responsive to processing at the ECU of image data captured by the camera, determines a condition exterior of the vehicle. The vehicular control system, while the vehicle is operating in a power operational mode, switches from the power operational mode to an economy operational mode based at least in part on the determined condition. The power operational mode provides greater performance of the vehicle compared to the economy operational mode, and the economy operational mode provides greater fuel efficiency for the vehicle compared to the power operational mode.

These and other objects, advantages, purposes and features of the present invention will become apparent upon review of the following specification in conjunction with the drawings.

DESCRIPTION OF THE PREFERRED EMBODIMENTS

A vehicle vision system and/or vehicle control system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
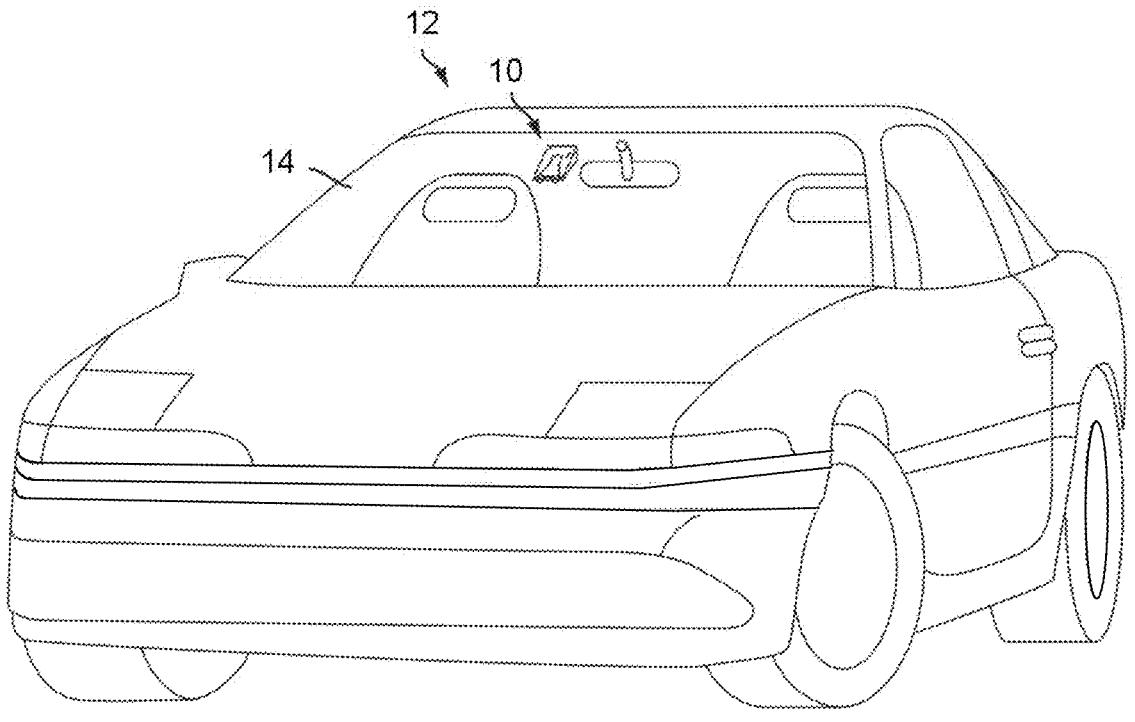
FIG. 1 is a perspective view of a vehicle with a control system that incorporates a camera.

Referring now to the drawings and the illustrative embodiments depicted therein, a vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring at least forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) having electronic circuitry and associated software, with the electronic circuitry including a data processor or image processor that is operable to process image data captured by the camera or cameras, whereby the ECU may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle.

Increasing fuel efficiency is an important goal for automotive manufacturers and drivers alike. Many vehicles offer different operational modes that alter control and handling of the vehicle. For example, many vehicles offer an economy operational mode (e.g., an "eco mode") that puts restrictions in place (e.g., speed restrictions, acceleration restrictions, engine restrictions, climate control restrictions, etc.) to reduce fuel consumption. Other operation modes offer other benefits. For example, a power operational mode (e.g., a "sport mode") may provide maximum power to the engine, allowing the driver to handle the vehicle with maximum speed and acceleration capabilities. Implementations herein provide intelligent switching between an economy operational mode and power operational mode (or any other operational modes) based on the current, recent, and/or future predicted driving patterns/road environment. For example, when the driver is traveling in a mixture of high traffic and low traffic areas, a control system automatically switches between economy (e.g., during the low traffic areas) and power mode (e.g., during the high traffic areas) based on the driving pattern/road environment. The control system includes a software algorithm executed by a respective ECU, which controls switching between the different operational modes.

Conventional vehicles often provide two or more available operational modes. For example, vehicles commonly include both the power operational mode (e.g., a sport mode or the like) and the economy operational mode. The economy operational mode may represent a fuel efficiency mode while the power operational mode represents a mode for high power demand from the driver. Other modes may also be offered, such as an inclement weather mode (where, for example, four-wheel drive is continuously engaged). In the power operational mode, fuel efficiency is not the expectation, but instead the expectation is for maximum or immediate power. When the driver is traveling along a route with a combination or mixture of high traffic and low traffic areas, the optimal operational mode may vary along the drive (i.e., at some portions of the drive, the economy operational mode would be ideal because the extra power is not needed while along other portions of the drive, the power operational mode would be ideal because the extra power is needed or helpful). In scenarios such as these, implementations herein include a control system that provides automatic switching of the modes based on a determined current optimal/ideal operational mode. The control system includes a software algorithm addition that executes on an ECU or other computing device at the vehicle (e.g., a battery monitoring system (BMS) ECU of an electric vehicle, an engine management ECU in a gasoline/diesel vehicle, etc.). The system may automatically switch between any available operational driving modes as the vehicle determines or predicts a most optimal operational mode in real-time based on current conditions around the vehicle (e.g., location, traffic, weather, time of day, type of road, etc.).

Based on different input scenarios, the ECU or other control determines and provides commands for automatic switching between, for example, economy and power operational modes (and optionally, other modes, such as a four-wheel drive mode, a comfort mode, a "normal" mode, etc.). Depending on the mode, the performance (e.g., acceleration and/or velocity), the handling (e.g., suspension), and/or the climate controls of the vehicle may be adjusted. The ECU executes the switching algorithm to determine the current operational mode that would provide the most benefit to the occupants of the vehicle based on the current context of the vehicle and the occupants. For example, when the system determines that power is unlikely to be needed (e.g., the system determines based on sensor data or traffic data or map data that there is little traffic near the vehicle), the system may automatically select the economy operational mode to increase fuel efficiency. On the other hand, when the system determines that traffic is heavier than a threshold level, the system may automatically switch to the power operational mode to ensure the vehicle/driver has maximum power and acceleration to maneuver through traffic. The system does not require any additional hardware. The system may be incorporated into any type of vehicle (e.g., an electric vehicle, a gasoline/diesel vehicle, a hybrid vehicle, etc.) to improve fuel efficiency without any human intervention. For example, electric vehicles are a modern trend in the auto industry and the control system could extend the range of electric vehicles.

Figure 2:
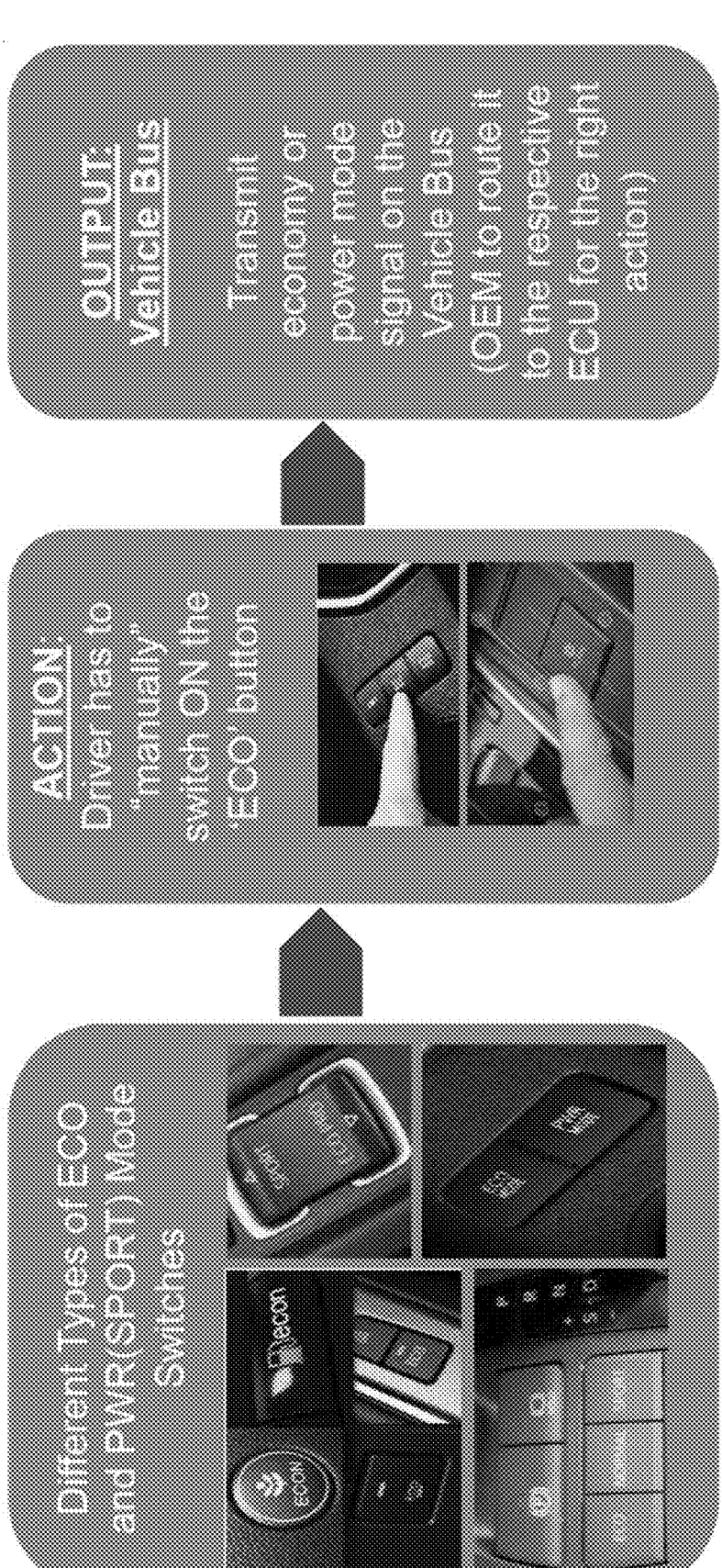
FIG. 2 is a flow chart for conventional mode switching of a vehicle.

As shown in FIG. 2, in conventional vehicles, a driver of the vehicle manually switches between modes of the vehicle (e.g., between an economy mode and a power mode). However, drivers are often unaware or are forgetful of such modes or switching is too much of an inconvenience, and thus drivers often neglect to take advantage of the different operational modes (instead generally leaving the vehicle in the default operational mode or switching to a mode and leaving it there for the duration of the drive). The control system leverages these operational modes without human intervention to increase fuel efficiency without any inconvenience to the driver.

The control system may determine the appropriate or ideal or optimal mode based on determining one or more conditions (e.g., driving conditions, such as traffic conditions, road conditions, weather conditions, etc.) of the vehicle or environment or condition of one or more occupants using a variety of different inputs. For example, the system may receive a status of a cruise control system of the vehicle (e.g., enabled or disabled), past and recent driving patterns of the current driver (e.g., constant speed for a threshold period of time, acceleration patterns, braking patterns, etc.), navigational data (e.g., current location, current route information, past route information, etc.), environmental conditions (e.g., temperature, presence of precipitation, ambient light levels, etc.), a current operational mode status (e.g., economy mode enabled or disabled). The system may determine current conditions of the occupants of the vehicle, such as a temperature of the occupants. The system may receive data from any number of sensors of the vehicle, such as environmental conditions captured by the camera (e.g., weather conditions, road conditions, traffic conditions, etc.) or other sensors (e.g., radar sensors, lidar, ultrasonic sensors, etc.).

Optionally, the system may determine traffic and other road conditions (current or future) from a navigation system of the vehicle (e.g., a GPS sensor and a map or traffic database or the like). The system may determine common or preferred driving habits of the driver or other occupant of the vehicle based on a profile associated with the driver or occupant. Based on these inputs, the control system automatically selects an available mode (e.g., an economy mode or a power operational mode) for the vehicle. In some examples, the system attempts to increase fuel efficiency to whatever extent possible without inconveniencing/endangering the occupants of the vehicle. That is, the system switches to the economy mode whenever it is both safe and convenient (e.g., in a low traffic area and/or in good weather conditions) to maximize fuel efficiency. The control system generates an output on the vehicle bus instructing the appropriate system(s) to switch modes accordingly.

The system may continuously or periodically monitor the conditions (e.g., traffic conditions, weather conditions, etc.) and adjust the mode based on changes in conditions. The driver or other occupant of the vehicle may override the system by manually selecting a mode (e.g., via a user input such as a button, switch, voice command, a touch screen, etc.). The system may remain in the manually selected mode until the driver disables the mode, until the current drive ends, or based on a predefined amount of time.

Figure 3:
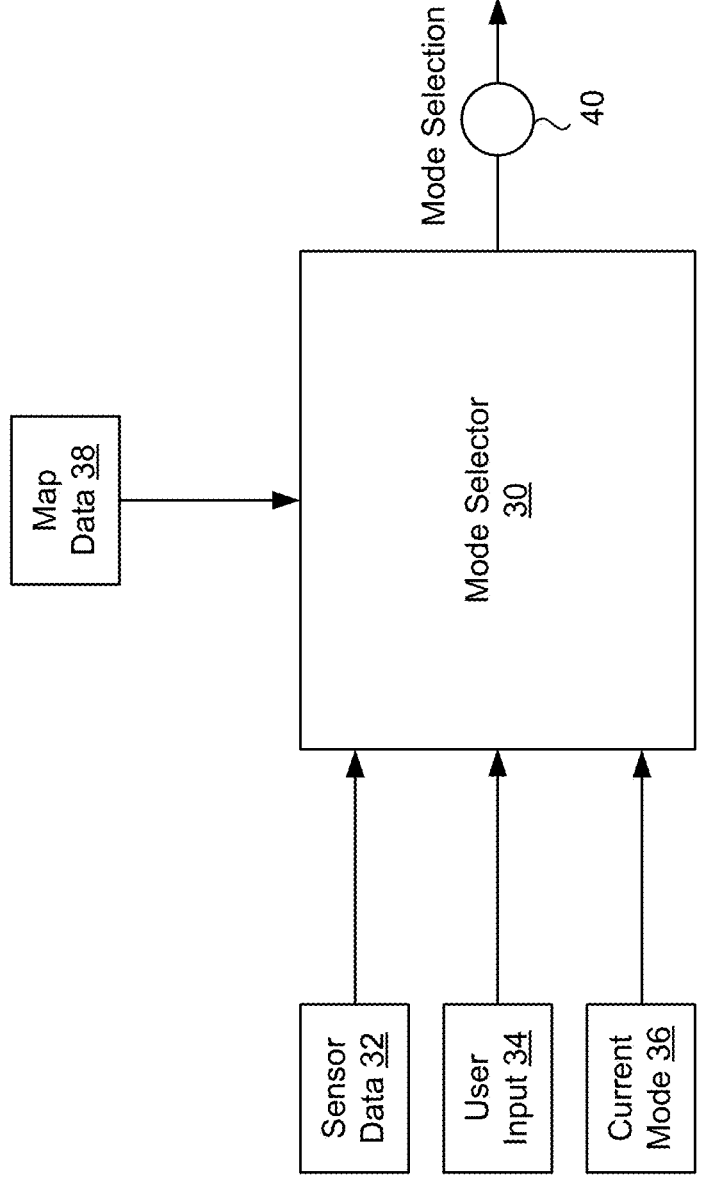
FIG. 3 is a block diagram of a mode selector for the control system of FIG. 1.

Referring now to FIG. 3, the system includes a mode selector 30. The mode selector receives sensor data 32. The sensor data 32 can include data from any number of sensors, such as image data captured by a camera, radar data captured by a radar sensor, GPS data, temperature data, etc. The mode selector 30 may also receive user input 34, such as a manual user selection of a driving mode. Additionally, the mode selector 30 receives the current driving mode 36 that the vehicle is operating in. Optionally, the mode selector 30 receives other data such as map data 38, weather data, profile data that includes driving behaviors or driving preferences of one or more occupants of the vehicle, etc. The mode selector 30 may receive the data from memory disposed at the vehicle or from a remote server (e.g., via the Internet).

The mode selector 30, based on the received data, generates a mode selection 40 that selects a driving mode from the available driving modes of the vehicle. The vehicle may include any number of driving modes, such as a sports mode, power mode, normal mode, economy mode, comfort mode, four-wheel drive mode, etc. For example, the mode selector 30 switches the vehicle from a power operational mode (e.g., a sports mode or power mode) to an economy operational mode (e.g., an econ mode). The power operational mode may provide greater performance of the vehicle (e.g., velocity, acceleration, etc.) compared to the economy operational mode. The economy operational mode may provide greater fuel efficiency for the vehicle compared to the power operational mode. The mode selector 30 may include a lookup table or other algorithm to generate the mode selection 40. In some examples, the mode selector 30 includes a model such as a machine learning algorithm (e.g., a neural network or the like) that predicts the mode selection 40 based on training data. The training data may be derived from data based on the current vehicle and occupants (e.g., by monitoring the received data while the driver drives the vehicle). Additionally or alternatively, the model of the mode selector 30 is pre-trained on a large training set that includes data from other vehicles and/or drivers.

In some examples, the user input 34 includes user configuration. The user may configure thresholds or other parameters for the mode selector 30 to use when generating the mode selection 40. For example, the user may provide user input 34 indicating that the mode selector 30 is to only switch to a particular mode when the vehicle is traveling certain speeds, at certain times, or in certain locations.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least two million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715, 093; 6,922,292; 6,757,109; 6,717,610; 6,590,719; 6,201, 642; 5,796,094; 6,559,435; 6,831,261; 6,822,563; 6,946, 978; 7,720,580; 8,542,451; 7,965,336; 7,480,149; 5,877,

7

897; 6,498,620; 5,670,935; 5,796,094; 6,396,397; 6,806, 452; 6,690,268; 7,005,974; 7,937,667; 7,123,168; 7,004, 606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:

a camera disposed at a vehicle equipped with the vehicular control system, the camera viewing exterior of the vehicle;

wherein the camera is operable to capture image data;

wherein the camera comprises a CMOS imaging array, and wherein the CMOS imaging array comprises at least one million photosensors arranged in rows and columns;

an electronic control unit (ECU) comprising electronic circuitry and associated software;

wherein image data captured by the camera is transferred to the ECU;

wherein the electronic circuitry of the ECU comprises an image processor that is operable to process image data captured by the camera and transferred to the ECU;

wherein the vehicular control system, responsive to processing at the ECU of image data captured by the camera, determines a quantity of vehicles within the field of view of the camera;

wherein the vehicular control system, responsive to determining the quantity of vehicles within the field of view of the camera, determines a traffic condition exterior of the vehicle;

wherein the vehicular control system, while the vehicle is operating in a power operational mode, switches from the power operational mode to an economy operational mode based at least in part on the determined traffic condition;

wherein the vehicular control system, responsive to processing at the ECU of image data captured by the camera, determines a second traffic condition exterior of the vehicle;

wherein the vehicular control system, while the vehicle is operating in the economy operational mode and based on the determined second traffic condition, switches from the economy operational mode to the power operational mode; and wherein the power operational mode provides greater performance of the vehicle compared to the economy operational mode, and wherein the economy operational mode provides greater fuel efficiency for the vehicle compared to the power operational mode.

2. The vehicular control system of claim 1, wherein the determined traffic condition comprises a traffic condition of a traffic lane the vehicle is currently traveling along.

3. The vehicular control system of claim 2, wherein the determined traffic condition comprises a low-traffic condition.

4. The vehicular control system of claim 1, wherein the determined traffic condition further comprises an environmental condition.

5. The vehicular control system of claim 4, wherein the environmental condition comprises a weather condition.

6. The vehicular control system of claim 1, wherein the vehicular control system determines the traffic condition based in part on navigation data from a navigation system of the vehicle.

7. The vehicular control system of claim 1, wherein the vehicular control system determines the traffic condition based in part on a status of a cruise control function of the vehicle.

8. The vehicular control system of claim 1, wherein the determined second traffic condition comprises a high-traffic condition.

9. The vehicular control system of claim 1, wherein the determined traffic condition is further based on a driving pattern of a driver of the vehicle.

10. The vehicular control system of claim 1, wherein the vehicle is an electric vehicle.

11. The vehicular control system of claim 1, wherein the vehicular control system, responsive to a user input while the vehicle is operating in the economy operational mode, switches from the economy operational mode to the power operational mode.

12. The vehicular control system of claim 1, wherein the vehicular control system, responsive to data stored at a profile associated with the driver of the vehicle while the vehicle is operating in the economy operational mode, switches from the economy operational mode to the power operational mode.

13. The vehicular control system of claim 12, wherein the data comprises driving preferences of the driver.

14. A vehicular control system, the vehicular control system comprising:

a camera disposed at a vehicle equipped with the vehicular control system, the camera viewing exterior of the vehicle;

wherein the camera is operable to capture image data;

wherein the camera comprises a CMOS imaging array, and wherein the CMOS imaging array comprises at least one million photosensors arranged in rows and columns;

an electronic control unit (ECU) comprising electronic circuitry and associated software;

wherein image data captured by the camera is transferred to the ECU;

wherein the electronic circuitry of the ECU comprises an image processor that is operable to process image data captured by the camera and transferred to the ECU;

wherein the vehicular control system, responsive to processing at the ECU of image data captured by the camera, determines a quantity of vehicles within the field of view of the camera;

wherein the vehicular control system, responsive to determining the quantity of vehicles within the field of view of the camera, determines a traffic condition exterior of the vehicle, and wherein the traffic condition comprises a low-traffic condition;

wherein the vehicular control system, while the vehicle is operating in a power operational mode, switches from the power operational mode to an economy operational mode based at least in part on the low-traffic condition;

wherein the vehicular control system, responsive to processing at the ECU of image data captured by the camera, determines a second traffic condition exterior of the vehicle;

wherein the vehicular control system, while the vehicle is operating in the economy operational mode and based on the determined second traffic condition, switches from the economy operational mode to the power operational mode;

wherein the power operational mode provides greater performance of the vehicle compared to the economy operational mode, and wherein the economy operational mode provides greater fuel efficiency for the vehicle compared to the power operational mode; and wherein the vehicular control system, responsive to a user input while the vehicle is operating in the economy operational mode, switches from the economy operational mode to the power operational mode.

15. The vehicular control system of claim 14, wherein the vehicular control system determines the traffic condition based in part on navigation data from a navigation system of the vehicle.

16. The vehicular control system of claim 14, wherein the vehicular control system determines the traffic condition based in part on a status of a cruise control function of the vehicle.

17. A vehicular control system, the vehicular control system comprising:

a camera disposed at a vehicle equipped with the vehicular control system, the camera viewing exterior of the vehicle;

wherein the camera is operable to capture image data;

wherein the camera comprises a CMOS imaging array, and wherein the CMOS imaging array comprises at least one million photosensors arranged in rows and columns;

an electronic control unit (ECU) comprising electronic circuitry and associated software;

wherein image data captured by the camera is transferred to the ECU;

wherein the electronic circuitry of the ECU comprises an image processor that is operable to process image data captured by the camera and transferred to the ECU;

wherein the vehicular control system, responsive to processing at the ECU of image data captured by the camera, determines a quantity of vehicles within the field of view of the camera;

wherein the vehicular control system, responsive to determining the quantity of vehicles within the field of view of the camera, determines a traffic condition exterior of the vehicle;

wherein the vehicular control system, responsive to data stored at a profile associated with the driver of the vehicle while, determines driving preferences of the driver of the vehicle;

wherein the vehicular control system, while the vehicle is operating in a power operational mode, switches from the power operational mode to an economy operational mode based at least in part on (i) the determined traffic condition and (ii) the driving preferences of the driver of the vehicle;

wherein the vehicular control system, responsive to processing at the ECU of image data captured by the camera, determines a second traffic condition exterior of the vehicle;

wherein the vehicular control system, while the vehicle is operating in the economy operational mode and based on the determined second traffic condition, switches from the economy operational mode to the power operational mode; and wherein the power operational mode provides greater performance of the vehicle compared to the economy operational mode, and wherein the economy operational mode provides greater fuel efficiency for the vehicle compared to the power operational mode.

18. The vehicular control system of claim 17, wherein the determined traffic condition further comprises an environmental condition.

19. The vehicular control system of claim 18, wherein the environmental condition comprises a weather condition.

20. The vehicular control system of claim 17, wherein the vehicular control system determines the traffic condition based in part on navigation data from a navigation system of the vehicle.

* * * * *